(12) United States Patent
Casati et al.

(10) Patent No.: US 6,354,732 B1
(45) Date of Patent: Mar. 12, 2002

(54) TEMPERATURE CALIBRATION FOR A THERMOGRAVIMETRIC ANALYZER

(75) Inventors: Donato Casati, Merate; Fabio Mauri, Bernareggio, both of (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/618,926

(22) Filed: Jul. 18, 2000

(30) Foreign Application Priority Data

Jul. 21, 1999 (GB) .............................. 9917035

(51) Int. Cl.⁷ ..................... G01N 25/04; G01K 11/06; G01K 19/00
(52) U.S. Cl. ............... 374/14; 374/1; 73/1.13
(58) Field of Search ................ 374/1, 14, 10, 374/31, 33; 73/1.13; 116/201, 207, 215, 216, 217

(56) References Cited

U.S. PATENT DOCUMENTS

| | | | | |
|---|---|---|---|---|
| 3,902,354 A | * | 9/1975 | Harlan et al. ................. | 374/14 |
| 4,343,373 A | * | 8/1982 | Stadler et al. ................ | 73/1.13 |
| 4,606,649 A | * | 8/1986 | Mikhail ........................ | 374/10 |
| 4,977,969 A | * | 12/1990 | Leisinger et al. ............. | 73/1.13 |
| 5,799,606 A | * | 9/1998 | Volk et al. ................... | 116/217 |
| 6,302,054 B1 | * | 10/2001 | Mayer, III ................... | 116/216 |

FOREIGN PATENT DOCUMENTS

| | | |
|---|---|---|
| GB | 480 022 A | 9/1937 |
| GB | 1 385 488 A | 2/1975 |
| GB | 1 540 733 A | 2/1979 |

* cited by examiner

*Primary Examiner*—Diego Gutierrez
*Assistant Examiner*—Madeline Gonzalez
(74) *Attorney, Agent, or Firm*—Ira D. Blecker

(57) ABSTRACT

An apparatus and method for the temperature calibration of a thermogravimetric analyzer. The apparatus includes a crucible, a weight, and a corresponding metal foil. The metal foil supports the weight in the crucible until the melting point of the metal foil is reached. When the melting point of the foil is reached, the metal foil is no longer able to support the weight, causing the dropping of the weight in the crucible.

10 Claims, 1 Drawing Sheet

TEMPERATURE CALIBRATION FOR A THERMOGRAVIMETRIC ANALYZER

TECHNICAL FIELD

The present invention relates to a method and system for temperature calibration of a thermogravimetric analyzer.

BACKGROUND OF THE INVENTION

Thermogravimetric equipments are used in many industrial and scientific environments to analyze the characteristics of a broad range of materials either solid or liquid. One of the main uses of a thermogravimetric analyzer is to measure the mass variations caused by sensible changes of temperature in a material specimen. Thermogravimetric analyzers must be able to continuously measuring the mass of a specimen in a controlled atmosphere and in a controlled environment over a selected period of time.

FIG. 1 shows schematically the structure and the functioning of a thermogravimetric analyzer. The specimen to be analyzed is placed on a crucible 101 on a plate of a very sensitive (e.g. sensitive to 5 $\mu$g) electronic microbalance 103 inside a furnace 105 having an inert atmosphere (e.g. purified grade $N_2$ or other inert gas). The temperature inside the furnace 105 is then continuously varied by means of a temperature programmer, which provides a linear rate of rise; e.g. the temperature may be incremented by 10° C./min from 25° C. to 800° C. The variations of temperature are measured by a thermocouple 107 and the variations in the specimen mass are measured by the microbalance 103. These measurements are usually executed by a computer 109 for obtaining indications of the change of mass in relation to temperature changes.

This mass change curve in thermogravimetry is normally influenced by many features which are characteristic of the thermogravimetric analyzer, e.g. the shape and composition of the specimen holder, the design of the furnace or the precision of the measuring sensors. These differences make it difficult to obtain absolute results and to compare experiments made with different equipment. For the above reasons a calibration of the thermogravimetric analyzer must be done.

According to the "Standard Practice for Calibration of Temperature Scale for Thermogravimetry" E1582-93 approved on Nov. 15, 1993 by the American Society for Testing and Materials (ASTM) and published January 1994, this calibration can be done either by measurement of a melting or a magnetic (Curie Point) transition temperature from the standard reference temperature. The above referenced Standard Practice describes three procedures for temperature calibration of Thermogravimetric analysers: two using melting point standards, one using magnetic transition standards for calibration.

Curie point is defined as the temperature at which ferromagnetic properties disappear and it occurs within a range of temperatures rather than at a precise temperature point. On the contrary, the melting point of metals is a well established physical property which occurs at precise temperatures. For this reason, the method based on melting point of metals (standard materials) is usually preferred to set a temperature calibration scale.

However the known methods using the melting points usually require complex manual operation for each single test: a new operation is required for each metal sample used as calibration point. This is not only time consuming, but could also cause inaccurate results due to different operator's experience.

It is an object of the present invention to alleviate the above drawbacks of the prior art.

BRIEF SUMMARY OF THE INVENTION

The object of the present invention has been achieved by providing according to a first aspect of the invention an apparatus for temperature calibration of a thermogravimetric analyzer comprising:

a crucible;

at least one weight;

a metal foil corresponding to the at least one weight and having a melting point, said metal foil supporting said at least one weight in said crucible, wherein when said melting point is reached, said metal foil is not able to support said at least one weight causing the dropping of said at least one weight in the crucible.

According to a second aspect of the invention there is provided a thermogravimetric analyzer and calibration apparatus comprising:

a furnace;

a microbalance for measuring changes of mass inside the furnace;

a temperature controller to control the themperature inside the furnace;

a recording apparatus to record changes of mass inside the furnace in relation to temperature changes; and an apparatus for temperature calibration of the thermogravimetric analyzer placed in the furnace comprising:

a crucible placed on said microbalance;

at least one weight;

a metal foil corresponding to said at least one weight and having a melting point, said metal foil supporting said at least one weight in said crucible, wherein when said melting point is reached, said metal foil is not able to support said at least one weight causing the dropping of the weight in the crucible.

According to a third aspect of the invention, there is provided a method for temperature calibration of a thermogravimetric analyzer including a furnace, a microbalance for measuring changes of mass inside the furnace, a temperature controller to control temperature inside the furnace and a recording apparatus, the method comprising the steps of:

suspending within the furnace at least one weight by a corresponding metal foil having a melting point above which the metal foil is not able to support the at least one weight;

increasing the temperature inside the furnace until at least the melting point of the foil is reached causing the dropping of the at least one weight;

detecting, by means of the microbalance, the dropping of the at least one weight and recording the temperature at the moment of said detecting.

According to a fourth aspect of the invention there is provided a method for temperature calibration of a thermogravimetric analyzer including a furnace, a microbalance for measuring changes of mass inside the furnace, a temperature controller to control temperature inside the furnace and a recording apparatus, the method comprising the steps of:

suspending within the furnace a plurality of weights by a corresponding plurality of metal foils, each of the plurality of metal foils having a different melting point above which the metal foil is not able to support its corresponding weight;

increasing the temperature inside the furnace until at least the lower of the melting points of the foils is reached causing the dropping of its corresponding weight, the plurality of metal foils being arranged so that when a weight drops it does not hit a metal foil having a higher melting point;

detecting, by means of the microbalance, the dropping of the corresponding weight and recording the temperature at the moment of said detecting.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE PREFERRED EMBODIMENT

Figure 1:
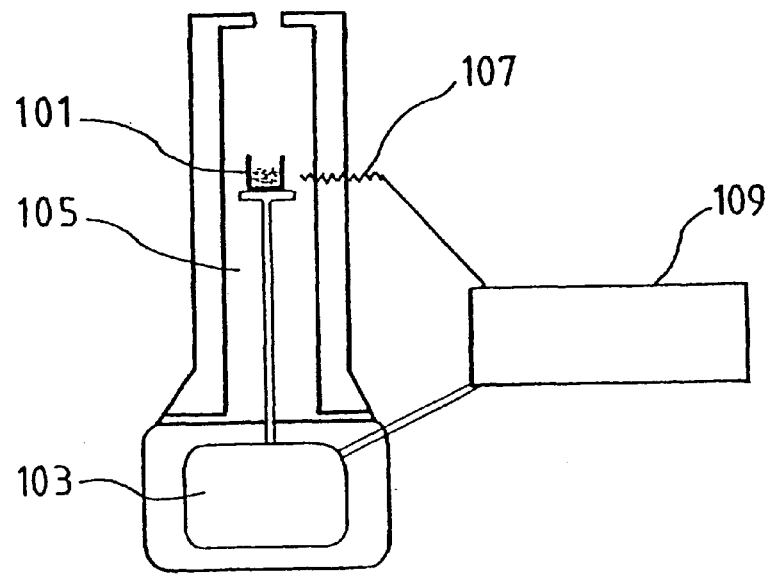
FIG. 1 shows schematically a thermogravimetric analyzer.
Figure 2:
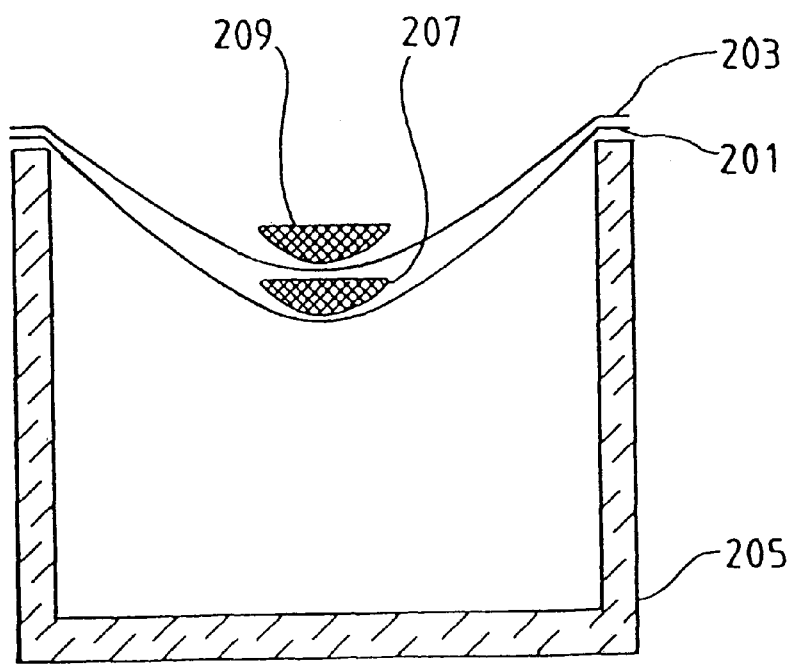
FIG. 2 is an example of a preferred embodiment of the present invention.

With reference to FIG. 2 a preferred embodiment of the present invention is shown. A sandwich of thin metal foils 201 and 203 (elemental metal foils, not alloy foils) having different melting points (the lower one having a lower melting point) is assembled and put on top of a crucible 205. Weights 207 and 209 are placed on each foil. The crucible is then used to calibrate the temperature scale of the thermogravimetric analyzer described in FIG. 1. The crucible is placed on the microbalance plate 101 and the temperature is progressively increased at a constant rate, while the variation of weight and temperature are recorded by the computer. When the melting temperature of the first metal foil 201 is reached, the foil will melt releasing the weight 207 which will fall on the bottom of the crucible causing a little shock to the microbalance 103. This shock is recorded by the thermogravimetric analyzer and represents, in a thermograph of temperature/weight the melting point of the first metal foil 201. As far as the temperature further increases, the metal of the other foil 203 melts releasing the weight 209 causing another shock which will correspond on the thermograph to the melting point of the second metal.

According to a preferred embodiment of the present invention the first metal foil 201 is made of tin, with a melting point at 231.9° C., while the second foil 203 is aluminum with a melting point of 660.3° C.; the metal weights 207 and 209 are made of platinum, each one having a mass of about 50 mg; their shape is preferably substantially hemispherical to allow a high pressure on the metal foil surfaces while maintaining a thin space thickness. Obviously many other different embodiments, shapes and materials may be used according to the range of temperatures required and the level of accuracy desired. For example the foils may be more than two (or even only one). The choice of metal for the foils closely depends on the temperature range of interest: e.g. an assembly comprising Tin and Zinc foils could cover a range 100° C. to 500° C.; another assembly with Aluminium and Silver would go from 500° C. to 1000° C. Furthermore other materials (e.g. Gold, Stainless Steel, Nickel-Chromium) or other shapes (e.g. rods or spheres) may be used for the weights.

The above described assembly is very easy to use and avoids all the complex preparation steps of the prior art method. At the same time it allows a multi-point calibration with a single run of analysis. In a preferred embodiment of the present invention the crucible described above is built as a standard calibration kit which can be used with many different kind of thermogavimetric analysers, ensuring reproducible results.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed:

1. An apparatus for temperature calibration of a thermogravimetric analyzer comprising:
    a crucible;
    at least one weight;
    a metal foil corresponding to the at least one weight and having a melting point, said metal foil supporting said at least one weight in said crucible, wherein when said melting point is reached, said metal foil is not able to support said at least one weight causing the dropping of said at least one weight in the crucible.

2. The apparatus of claim 1 further comprising a plurality of weights, each weight being supported by a corresponding metal foil with each metal foil having a different melting point, said plurality of metal foils being arranged so that when a weight drops it does not hit a metal foil having a higher melting point.

3. The apparatus of claim 2 wherein each weight has substantially the shape of a hemisphere.

4. The apparatus of claim 3 wherein each weight is made of platinum.

5. The apparatus of claim 1 further comprising two weights, the first weight being supported by means of a tin foil, the second weight being supported by means of an aluminium foil.

6. A thermogravimetric analyzer and calibration apparatus comprising:
    a furnace;
    a microbalance for measuring changes of mass inside the furnace;
    a temperature controller to control the temperature inside the furnace;
    a recording apparatus to record changes of mass inside the furnace in relation to temperature changes; and
    an apparatus for temperature calibration of the thermogravimetric analyzer placed in the furnace comprising:
        a crucible placed on said microbalance;
        at least one weight;
        a metal foil corresponding to said at least one weight and having a melting point, said metal foil supporting said at least one weight in said crucible, wherein when said melting point is reached, said metal foil is not able to support said at least one weight causing the dropping of the weight in the crucible.

7. The thermogravimetric is analyzer and calibration apparatus of claim 6 wherein the apparatus for temperature calibration of the thermogravimetric analyzer further comprising a plurality of weights, each weight being supported by a corresponding metal foil with each metal foil having a different melting point, the plurality of metal foils being arranged so that when a weight drops it does not hit a metal foil having a higher melting point.

8. The thermogravimetric analyzer and calibration apparatus of claim 6 wherein the apparatus for temperature calibration of the thermogravimetric analyzer further comprising two weights, the first weight being supported by means of a tin foil, the second weight being supported by means of an aluminium foil.

9. A method for temperature calibration of a thermogravimetric analyzer including a furnace, a microbalance for measuring changes of mass inside the furnace, a temperature controller to control temperature inside the furnace and a recording apparatus, the method comprising the steps of:

suspending within the furnace at least one weight by a corresponding metal foil having a melting point above which the metal foil is not able to support the at least one weight;

increasing the temperature inside the furnace until at least the melting point of the foil is reached causing the dropping of the at least one weight;

detecting, by means of the microbalance, the dropping of the at least one weight and recording the temperature at the moment of said detecting.

10. A method for temperature calibration of a thermogravimetric analyzer including a furnace, a microbalance for measuring changes of mass inside the furnace, a temperature controller to control temperature inside the furnace and a recording apparatus, the method comprising the steps of:

suspending within the furnace a plurality of weights by a corresponding plurality of metal foils, each of the plurality of metal foils having a different melting point above which the metal foil is not able to support its corresponding weight;

increasing the temperature inside the furnace until at least the lower of the melting points of the foils is reached causing the dropping of its corresponding weight, the plurality of metal foils being arranged so that when a weight drops it does not hit a metal foil having a higher melting point;

detecting, by means of the microbalance, the dropping of the corresponding weight and recording the temperature at the moment of said detecting.

* * * * *